(12) United States Patent
Izquierdo Ereño et al.

(10) Patent No.: US 8,708,133 B2
(45) Date of Patent: Apr. 29, 2014

(54) SYSTEM FOR LOADING AND UNLOADING FOODSTUFFS

(75) Inventors: Eneko Izquierdo Ereño, Oñati (ES); Bernhard Isenschmid, Schaffhausen (CH); Oliver Walter, Schaffhausen (CH)

(73) Assignee: ULMA Packaging Technological Center, S. Coop, Onati (ES)

(*) Notice: Subject to any disclaimer, the term of this patent is extended or adjusted under 35 U.S.C. 154(b) by 148 days.

(21) Appl. No.: 13/469,390

(22) Filed: May 11, 2012

(65) Prior Publication Data

US 2012/0288350 A1    Nov. 15, 2012

(30) Foreign Application Priority Data

May 12, 2011 (EP) .................................... 11382145

(51) Int. Cl.
*B65G 47/26* (2006.01)
*B65G 47/22* (2006.01)

(52) U.S. Cl.
CPC .................................... *B65G 47/22* (2013.01)
USPC ...................................... 198/456; 198/468.6

(58) Field of Classification Search
USPC ............ 198/456, 457.01, 457.07, 597, 468.6, 198/468.01
See application file for complete search history.

(56) References Cited

U.S. PATENT DOCUMENTS

| | | | |
|---|---|---|---|
| 3,269,565 A * | 8/1966 | Kemp, Jr. ....................... | 414/21 |
| 3,388,785 A | 6/1968 | Mothershaw | |
| 3,840,064 A * | 10/1974 | Von Woff ...................... | 164/213 |
| 5,238,100 A * | 8/1993 | Rose et al. ................. | 198/468.6 |
| 5,291,986 A * | 3/1994 | Wheaton ................... | 198/468.6 |
| 7,353,934 B2 * | 4/2008 | Brussel ...................... | 198/468.6 |

FOREIGN PATENT DOCUMENTS

| | | |
|---|---|---|
| EP | 0371687 A1 | 6/1990 |
| FR | 2725430 A1 | 4/1996 |
| JP | 57145718 A | 9/1982 |
| WO | WO2006/061024 A1 | 6/2006 |

OTHER PUBLICATIONS

Extended European Search Report, European Patent Application No. 11382145.8, The Hague, NL issued on Oct. 31, 2011, 4 pages, Munich Germany.

* cited by examiner

*Primary Examiner* — James R Bidwell
(74) *Attorney, Agent, or Firm* — Tim L. Kitchen; Peter B. Scull; Hamilton, DeSantis & Cha, LLP (57) ABSTRACT

A system for loading and unloading food products. In one implementation the system includes a transport device with a plurality of parallel belts upon which the products to be loaded move, and a tool adapted to load the products. The tool has a support adapted to pass through the gaps between the belts to load the product and to support the product when it is unloaded, and to perform the loading of the product moving it in an ascending vertical direction, the support lifting the product from the transport device. The support is adapted to rotate in relation to the support structure to unload the product, when they rotate, the support has a peripheral speed equal to the speed at which the product moves during the unloading.

36 Claims, 4 Drawing Sheets

SYSTEM FOR LOADING AND UNLOADING FOODSTUFFS

CROSS-REFERENCE TO RELATED APPLICATIONS

The present application relates to and claims priority to European Patent application No. 11382145.8, filed May 12, 2011.

FIELD

The invention relates to systems for loading and unloading foodstuffs, in particular flexible foodstuffs, and more specifically to systems used to load foodstuffs and unload them in packaging machines.

BACKGROUND

Systems for loading and unloading foodstuffs are known from the prior art. The foodstuffs move on a conveyor belt and a tool or robot loads them so that they can be taken to their final destination, where it unloads them.

Some of these systems comprise a conventional conveyor belt, and the tool comprises support means upon which the product is to be disposed when it is loaded, and in order to load the product the tool approaches the product from one side, making contact with the product laterally. This involves the evident risk of the product not being loaded correctly when it makes contact with it.

Other known systems in the prior art solve this problem by using a conveyor belt of the type known as Polycord, which comprises a plurality of parallel belts separate to each other. The use of this type of conveyor belt enables the product to be approached in a different manner that increases the chances of it being loaded correctly.

Document EP371687A1 discloses a system of this type, which in addition to the tool comprises a drive system disposed beneath the conveyor belt. Said drive system comprises a plurality of vertical segments that push the product, lifting it from the conveyor belt. The tool acts as a claw on the product in order to load it, once it has been lifted from the conveyor belt.

Document WO2006/061024A1 discloses a system for loading and unloading foodstuffs of this type. The tool comprises support means adapted to pass through the gaps between the belts of the transport means to collect the product and support the product when it is loaded, and performs the loading of the product, moving in a substantially vertical ascending direction, the support means moving in said direction, so that the support means lift the product from the transport means and support it. To unload the product, the tool performs a minor movement such as a pivoting movement, which causes the product disposed on the support means to slide on to them in order to be unloaded at its final destination.

SUMMARY

The system for loading and unloading foodstuffs of the invention comprises transport means that comprise a plurality of belts parallel and separate to each other, upon which the products to be loaded move in a longitudinal direction, and a tool adapted to load the products disposed on the transport means and unload them. The tool comprises support means adapted to pass through the gaps between the belts of the transport means to load the product and to support the product when it is loaded.

In order to load the product the tool is disposed beneath the product and moves in a substantially vertical ascending direction, the support means moving in said direction, so that the support means lifts the product from the transport means and supports it. As a result, the operation for loading a product is performed in a very simple manner as it only requires a simple movement of the tool, and in addition, as it loads the product from below it ensures correct loading in all cases, preventing the risk that arises in the event of a horizontal movement of the tool in order to load the product, where it can be the case that in the event of said movement a product is not caused to be disposed on the support means of the tool.

The support means comprises a plurality of rotary members that are adapted to rotate in relation to the support structure in order to unload the product, the rotary members comprising, when they rotate, a peripheral speed equal to the speed at which the product moves during the unloading. As a result, thanks to this rotation, the products are unloaded in a more efficient manner preventing the sliding of said product on the support means, which, depending on the type of product, could cause said product to bend for example during the unloading, with the result that it does not unload correctly, or it could even cause the product not to be unloaded due to it being stuck to the support means.

These and other advantages and characteristics of the invention will be made evident in the light of the drawings and the detailed description thereof.

DETAILED DESCRIPTION

The system 100 of the invention is used to load and unload foodstuffs or food products 2, in particular to load products 2 in the form of slices, preferably flexible ones, such as slices of cold meat, cheese or meat for example. The system 100 comprises transport means 1 that comprises a plurality of belts 10 parallel and separate to each other, which correspond to a conveyor belt known as a Polycord belt or an equivalent belt, upon which the products 2 to be loaded moves in a longitudinal direction L, and a tool 3 adapted to load the products 2 disposed on the transport means 1 and unload them. A product 2 is disposed on the transport means 1 and moves forward in a longitudinal direction L when the transport means 1 moves until reaching a certain position where it is loaded by the tool 3.

The tool 3 comprises support means adapted to pass through the gaps between the belts 10 of the transport means 1 to load the product 2 and to support the product 2 when it is loaded, the product 2 being disposed on the support means. The tool 3 performs the loading of the product 2 moving in a substantially vertical ascending direction, the support means moving in said direction, so that the support means lifts the product 2 from the transport means 1 and supports it. As a result, the operation for loading a product is performed in a very simple manner, also ensuring the correct loading of the product, as the support means does not encounter any resistance to the product 2 being supported by them for example.

The support means comprises a plurality of rotary members 33a; 33b that are adapted to rotate in relation to the support structure 31 in order to unload the product 2, the rotary members 33a; 33b comprising, when they rotate, a peripheral speed equal to the speed at which the product moves 2 during the unloading. As a result, the unloading is performed in a controlled manner, largely ensuring that the product drops to its final destination, generally to a specific arrangement of a packaging machine, in a correct manner, without being bent or without it being dropped in an uncontrolled manner to an unwanted position, as the sliding of the product 2 on the support means, which can cause the aforementioned uncontrolled dropping of the product, is prevented.

The tool 3 also comprises a stationary structure 30 to which the support structure 31 is joined with freedom of movement, the support structure 31 being adapted to move in relation to the stationary structure 30 in order to unload the product 2, the rotary members 33a; 33b moving in conjunction with the support structure 31. Thus, the rotary members 33a; 33b rotate in order to unload the product 2 and also move to aid the unloading of the product 2 from the tool 3. The movement of the support structure 31, and therefore of the rotary members 33a; 33b, can be both a displacement and a pivoting or even both simultaneously, as it will be explained below. In contrast, during the loading of the product 2 both the rotary members 33a; 33b and the support structure 31 remain static in relation to the stationary structure 30, thereby enabling and simplifying the loading operation.

Figure 1:
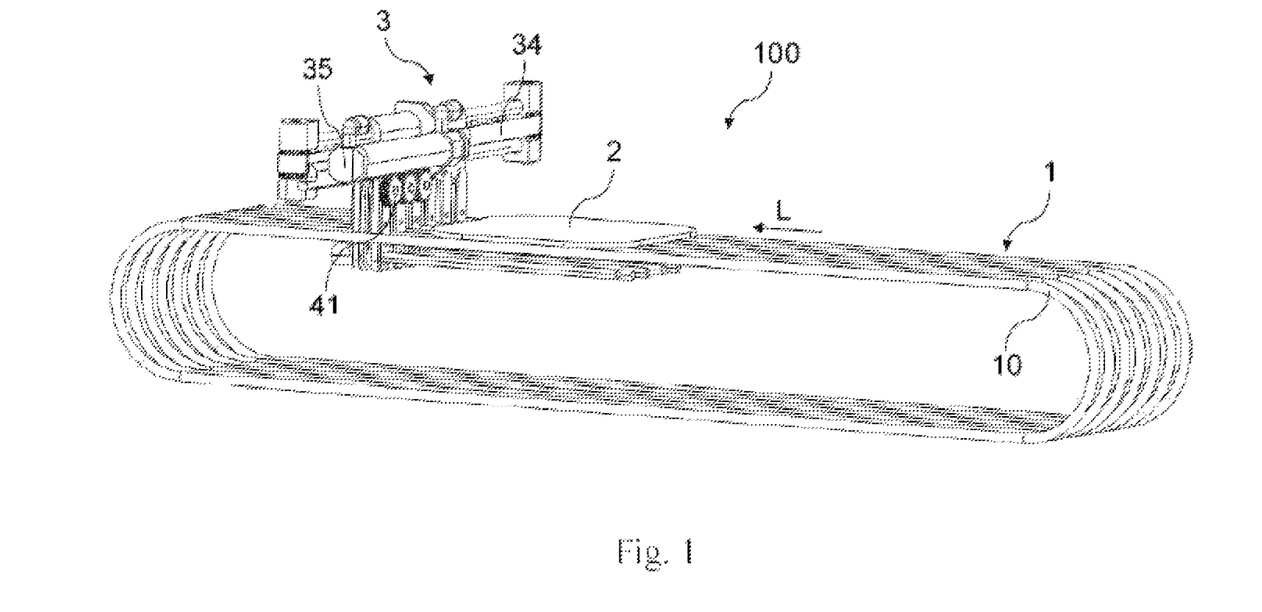
FIG. 1 shows a perspective view of an embodiment of the system of the invention.

FIG. 1 shows a first embodiment of the system 100 in which the support structure 31 is displaceable in a certain direction of displacement D in relation to the stationary structure 30 in order to unload the product 2, the rotary members 33a being displaceable in conjunction with the support structure 31 as well as rotatable in relation to the support structure 31. The tool 3 comprises actuation means to cause the displacement of the support structure 31, which comprises an actuator 35 that causes the displacement of the support structure 31 when it is operated, and a main belt 34 fixed to the support structure 31 and coiled in the stationary structure 30 with freedom of movement, the actuator 35 preferably corresponding with a cylinder that can be pneumatic and that can act on the main belt 34 or on the support structure 31 that is fixed to the main belt 34 by means of a base 310, so that a movement of the main belt 34 causes the displacement of the support structure 31 in the direction of displacement D or vice versa.

In the first embodiment, the rotary members 33a are longitudinal and parallel to each other, preferably three in number, which are joined to the support structure 31 at one end with freedom of rotation, and which are adapted to support the product 2 loaded from the transport means 1. In order to unload the product 2 the support structure 31 of the tool 3 is displaced in the direction of displacement D and the rotary members 33a rotate simultaneously to said displacement in relation to its longitudinal axis 33aR, in the direction opposite to the displacement, so that the peripheral speed of the rotary members 33a, when they rotate, is equal to the speed of displacement of the rotary members 33a in the direction of displacement D, but in an opposite direction, the relative speed between the product 2 and the rotary members 33a being null during the unloading of said product 2. As a result, when the rotary members 33a are displaced in the direction of displacement D, the product 2 remains in its position thanks to the rotation of the rotary members 33a, dropping to its final destination, which generally corresponds with a certain destination in a packaging machine for its subsequent packaging, when the rotary members 33a are displaced sufficiently in said direction of displacement D and stop acting as a support for the product 2. As a result, the product 2 is not compressed or bent during its unloading, nor does it stick to the rotary members 33a, and drops to its final destination in a controlled manner.

Figure 2:
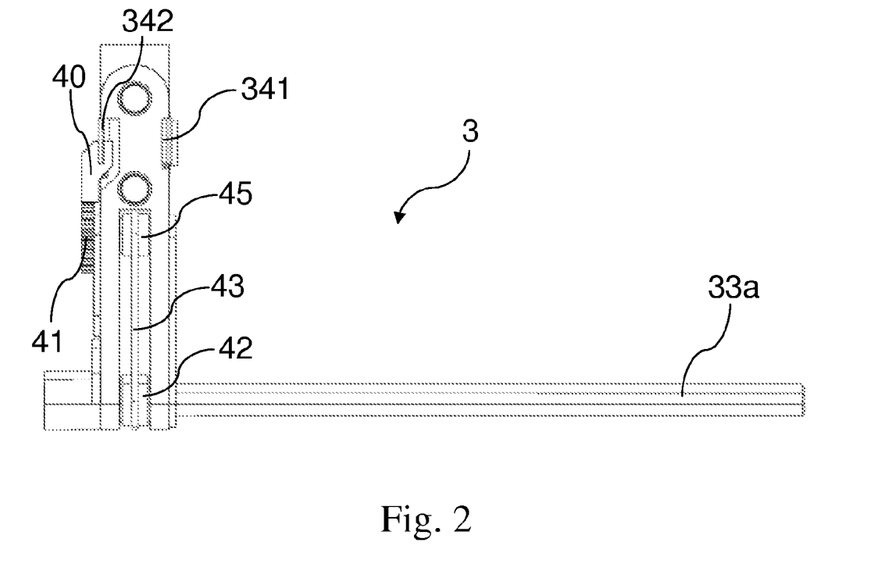
FIG. 2 shows a side view of a tool according to the embodiment of FIG. 1.

The tool 3 comprises drive means to cause the rotation of the rotary members 33a in relation to its longitudinal axis 33aR when the support structure 31 is displaced in the direction of displacement D, shown in FIG. 2. In the first embodiment, the drive means comprise a rack 40 that is attached to the support structure 31 and which causes the rotation of the rotary members 33a with the displacement of the support structure 31, ensuring simultaneity between the displacement and the rotation. The drive means also comprise, for each rotary member 33a, a gear wheel 41 that moves in conjunction with the support structure 31 and which cooperates with the rack 40, rotating when the support structure 31 is displaced in the direction of displacement D, an auxiliary wheel 42 that is fixed to the corresponding rotary member 33a and which is displaced in conjunction with the support structure 31, and a drive belt 43 or equivalent member that transmits the rotation of the gear wheel 41 to the corresponding auxiliary wheel 42, causing the rotation of the corresponding rotary member 33a. Preferably, the drive means comprise an axis 44 that rotates in conjunction with the gear wheel 41 and a drive wheel 45 fixed to said axis 44, the drive belt 43 joining the auxiliary wheel 42 and the drive wheel 45, so that it is the drive wheel 45 which transmits the rotation of the gear wheel 41 to the auxiliary wheel 42 through the drive belt 43. The rack 40 is fixed to the main belt 34, moving in conjunction with the main belt 34, and the auxiliary wheel 42 comprises a diameter substantially equal to double the diameter of the drive wheel 45, so that a peripheral speed of the rotary members 33a is maintained when they rotate equally but opposite to the speed of displacement of the rotary members 33a in the direction of displacement D. In another configuration of the first embodiment the rack 40 can be fixed to the stationary structure 30, in the event of which the drive wheel 45 and the auxiliary wheel 42 comprise the same diameter in order to maintain a peripheral speed of the rotary members 33a when they rotate equally but opposite to the speed of displacement of the rotary members 33a in the direction of displacement D. Although a gear wheel 41 is contemplated for each rotary member 33a, in another configuration of the first embodiment the drive means can comprise a single gear wheel 41 for all the rotary members 33a, the aforementioned relationship between the diameters of the drive wheel 45 and the auxiliary wheels 42 being maintained, depending on the circumstances.

In the first embodiment the support structure 31 comprises, in addition to the base 310, a segment 311 that is substantially perpendicular to the rotary members 33a, which is fixed at one end to the base 310, and which comprises an extension 311a for each rotary member 33a, the extensions 311a being parallel to each other. It is evident that in another configuration of the first embodiment the base 310 and the segment 311 can form a single element, or even that each extension 311a can correspond to a segment, comprising as many extensions 311a fixed to the base 310 as rotary members 33a. A rotary member 33a is joined to an end of its corresponding segment 311 with freedom of rotation, said end being opposite to the end at which the segment 311 is joined to the base 310. In addition, the gear wheel 41 and the auxiliary wheel 42 are joined with freedom of rotation to the corresponding segment 311, the gear wheel 41 being close to the end of the segment 311 that is joined to the base 310 and the auxiliary wheel 42 being close to the end of the segment 311 to which the corresponding rotary member 33a is joined.

Figure 3:
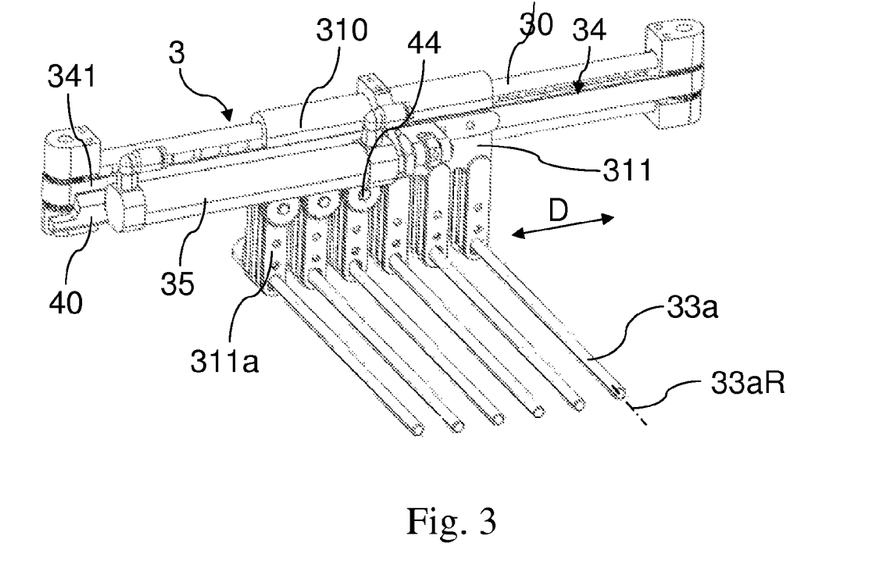
FIG. 3 is a perspective view of the tool of the system of FIG. 1, with support means of said tool supporting a product.
Figure 4:
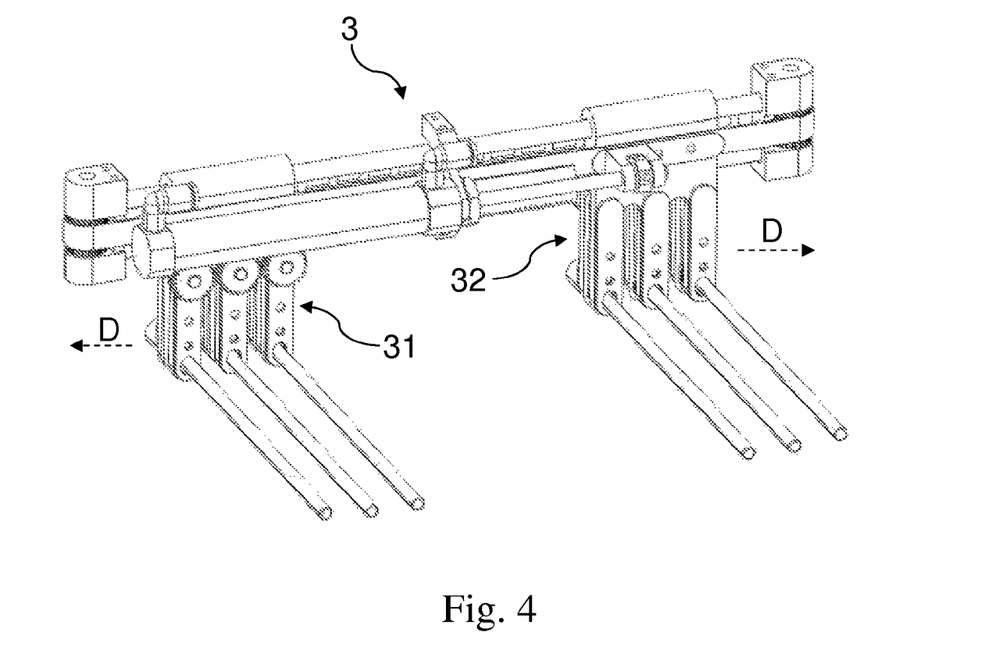
FIG. 4 is a perspective view of the tool of the system of FIG. 1, with two support structures moving with respect to each other to unload a product.

In a first embodiment, the tool 3 also comprises a second support structure 32 analogous to the first support structure 31, which is displaced in the direction of displacement D in relation to the stationary structure 30 when the first support structure 31 is displaced, but in the opposite direction. As a result, when the product 2 is loaded it is supported by the rotary members 33a of both support structures 31 and 32, as shown in FIG. 3, and when the product 2 is unloaded it drops on to its final destination through a gap between the rotary members 33a of the support structure 31 and the rotary members 33a of the second support structure 32, as shown in FIG. 4. To cause a displacement in opposite directions the support structure 31 is joined to a first segment 341 of the main belt 34, whereas the second support structure 32 is joined to a second segment 342 that is opposite in relation to a vertical plane of the tool 3, both segments 341 and 342 facing each other. The drive means comprise a rack 40 for each support structure 31 and 32, each rack 40 fixed on the corresponding segment 341 or 342 of the main belt 34. In another configuration the drive means can comprise a rack 40 for each support structure 31 and 32, both fixed to the stationary structure 30, or a single rack 40 that is sufficiently long to cause the displacement of the two support structures 31 and 32.

In another configuration of the first embodiment not shown in the Figures, the drive means can comprise a surface of friction that is attached to the support structure 31, to cause the rotation of the rotary members 33a by friction, instead of the rack 40. The drive means also comprises, for each rotary member 33a, a friction wheel that is displaced in conjunction with the support structure 31 and which cooperates with the surface of friction, rotating, when the support structure 31 is displaced in the direction of displacement D, an auxiliary wheel that is fixed to the corresponding rotary member 33a and that is displaced in conjunction with the support structure 31, and a drive belt that transmits the rotation of the friction wheel to the corresponding auxiliary wheel, causing the rotation of the corresponding rotary member 33a. The drive means can comprise a single friction wheel for all the rotary members 33a, instead of a friction wheel for each one.

In another configuration of the first embodiment not shown in the Figures, the drive means can comprise a motor, for example, to cause the rotation of the rotary members 33a or even a motor for each rotary member 33a, the motor (or motors) being operated when the support structure 31 is displaced. In another alternative configuration, the motor (or motors) can brake or lock the rotation of the rotary members 33a, enabling said rotation in order to unload the product 2, the rotary members 33a thereby rotating freely.

In a second embodiment not shown in the Figures, the tool 3 is analogous to that of the first embodiment, but only comprises one support structure 31 and as a result comprises only the actuation means necessary to displace the support structure 31 and the drive means necessary to cause the rotation of the rotary members 33a of the support structure 31. The various aforementioned configurations for the first embodiment can also be applied in the second embodiment insofar as they are applicable using a single support structure 31.

Figure 5:
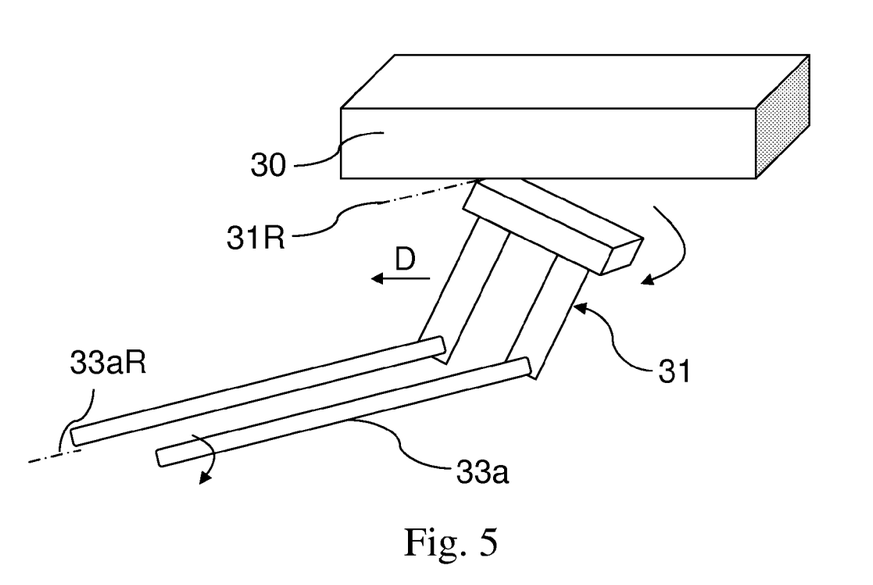
FIG. 5 schematically shows another embodiment of the system of the invention.

In a third embodiment of the system 100 shown in FIG. 5, the tool 3 differs from the tool 3 of the second embodiment in that the support structure 31 pivots in relation to an axis of rotation 31R in relation to the stationary structure 30 instead of moving, and in the drive means that cause the rotation of the rotary members 33a, which can comprise one motor or more, for example, as commented for example in the last configuration of the first embodiment. In another configuration, the motor (or motors) can brake or lock the rotation of the rotary members 33a, enabling said rotation in order to unload the product 2, the rotary members 33a thereby rotating freely. In the third embodiment the tool 3 does not comprise the actuation means to cause any displacement of the support structure 31 in relation to the stationary structure 30, and comprises additional drive means, to cause the support structure 31 to pivot simultaneously to the rotation of the rotary members 33a, which by way of example can be a motor that is synchronised with the drive means of the rotary members 33a. The axis of rotation 31R on which the support structure 31 pivots and the axis 31aR on which the rotary members 33a rotate are parallel to each other, and transverse to the stationary structure 30. The various aforementioned configurations for the first embodiment can also be applied in the third embodiment insofar as they are applicable using a single support structure 31 that is not displaced in relation to the stationary structure 30.

In a fourth embodiment of the system 100, not shown in the Figures, the tool 3 can be analogous to the tool 3 of the third embodiment but also comprises a second support structure 32 analogous to the first support structure 31, which pivots in the opposite direction to that in which the first support structure 31 pivots, the rotary members 33b of the first support structure 31 and the rotary members 33b of the second support structure 32 rotating in an opposite direction.

In a fifth embodiment of the system 100, the tool 3 differs from the tool 3 of the second embodiment in the drive means that cause the rotation of the rotary members 33a and in that the support structure 31 can, as well as moving, pivot in relation to the stationary structure 30. The rotation of the rotary members 33a occurs in the opposite direction to which the support structure 31 pivots and is displaced, the pivoting aiding the unloading of the product 2. The drive means can be equivalent to the drive means used in the first embodiment, but in this case they can also be adapted to cause the pivoting of the support structure 31, the gear wheel 41, for example, being fixed to the support structure 31 with the result that a rotation of the gear wheel 41 causes the pivoting of the support structure 31, for example. In another configuration the drive means can comprise a motor, for example, to cause the rotation of the rotary members 33a or even a motor for each rotary member 33a, all synchronised, the motor (or motors) being operated when the support structure 31 is displaced and pivots (or the motor (or motors) can brake or lock the rotation of the rotary members 33a, enabling said rotation in order to unload the product 2, the rotary members 33a thereby rotating freely), and the tool 3 can also comprise additional drive means, a motor for example, said motor being synchronised with the motor (or motors) of the rotary members 33a so that they can operate simultaneously. The various aforementioned configurations for the first embodiment can also be applied in the fourth embodiment insofar as they are applicable using a single support structure 31.

In the sixth embodiment of the system 100 not shown in the Figures, the tool 3 can be analogous to the tool 3 of the fifth embodiment but also comprises a second support structure 32 analogous to the first support structure 31, which pivots in the opposite direction to which the first support structure 31 pivots, the rotary members 33a of the first support structure 31 and the rotary members 33a of the second support structure 32 rotating in an opposite direction, and which is displaced in the direction of displacement D when the first support structure 31 is displaced, but in the opposite direction.

Figure 6:
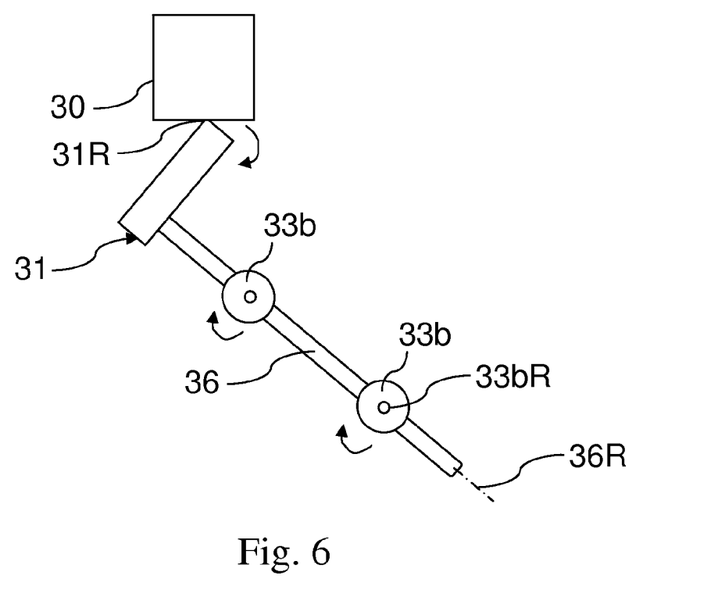
FIG. 6 is a schematic and side view of another embodiment of the system of the invention.

In a seventh embodiment of the system 100, shown schematically in FIG. 6, the support structure 31 pivots in relation to the stationary structure 30 in order to unload the product 2, so that the rotary members 33b slope towards the final destination of the product 2, ensuring a controlled drop of the product 2 thanks to the rotation of the support means. The support structure 31 comprises a plurality of support members 36 longitudinal and parallel to each other, and at least one rotary member 33b joined to each support member 36 with freedom of rotation, the axis of rotation 33bR in relation to which the rotary member 33b rotates being transverse to a longitudinal axis 36R of the corresponding support member 36 and the rotary members 33b rotating in the opposite direction to which the support structure 31 pivots. In a similar way to the third and fifth embodiment, the axis 31bR in relation to which the rotary members 33b rotate is also parallel to the axis of rotation 31R in relation to which the support structure 31 pivots, which in this case is transverse to the stationary structure 30. The tool 3 comprises drive means not shown in the Figures to cause the rotation of all the rotary members 33b simultaneously, which can be analogous to the first embodiment, which can correspond to a plurality of synchronised motors, one for each rotary member 33b, or with a single motor for all the rotary members 33b, and additional drive means to cause the pivoting of the support structure 31, which can be a motor for example, said motor being synchronised with the motor (or motors) of the rotary members 33b so that they operate simultaneously. In another configuration, the motor (or motors) can brake or lock the rotation of the rotary members 33a, enabling said rotation in order to unload the product 2, the rotary members 33a thereby rotating freely. In another configuration of the seventh embodiment, the rotary members correspond to at least one conveyor belt for each support member 36.

In an eighth embodiment of the system 10, not shown in the Figures, the tool 3 can be analogous to the tool 3 of the seventh embodiment but also comprises a second support structure 32 analogous to the first support structure 31, which pivots in the opposite direction to which the first support structure 31 pivots, the rotary members 33b of the first support structure 31 and the rotary members 33b of the second support structure 32 rotating in an opposite direction.

In a ninth embodiment of the system 100, the tool 3 differs from the tool 3 of the seventh embodiment in that the support structure 31 is displaced in relation to the stationary structure 30 in a direction of displacement D instead of pivoting. For this purpose, the tool 3 also comprises actuation means equivalent or analogous to those used in the first embodiment to cause the displacement. The drive means can be equal to those referred to in the first embodiment, although in this latter case the drive belt 43 has to be adapted to the circumstances and can require an additional drive wheel to guide the drive belt 43 correctly towards the rotary members 33b.

In a tenth embodiment of the system 100 not shown in the Figures, the tool 3 can be analogous to the tool 3 of the ninth embodiment but also comprises a second support structure 32 analogous to the first support structure 31, which is displaced in the opposite direction to which the first support structure 31 is displaced, the rotary members 33a of the first support structure 31 and the rotary members 33a of the second support structure 32 rotating in an opposite direction.

In an eleventh embodiment of the system 100, the tool 3 differs from the tool 3 of the seventh embodiment in that the support structure 31 can, as well as pivoting, be displaced in relation to the stationary structure 30 in a direction of displacement D. The actuation means can be equivalent or analogous to those used in the first embodiment to cause the displacement, the drive means can be equal to those referred to in the ninth embodiment, and the pivoting can be caused in the same manner as commented in the third embodiment.

Figure 7:
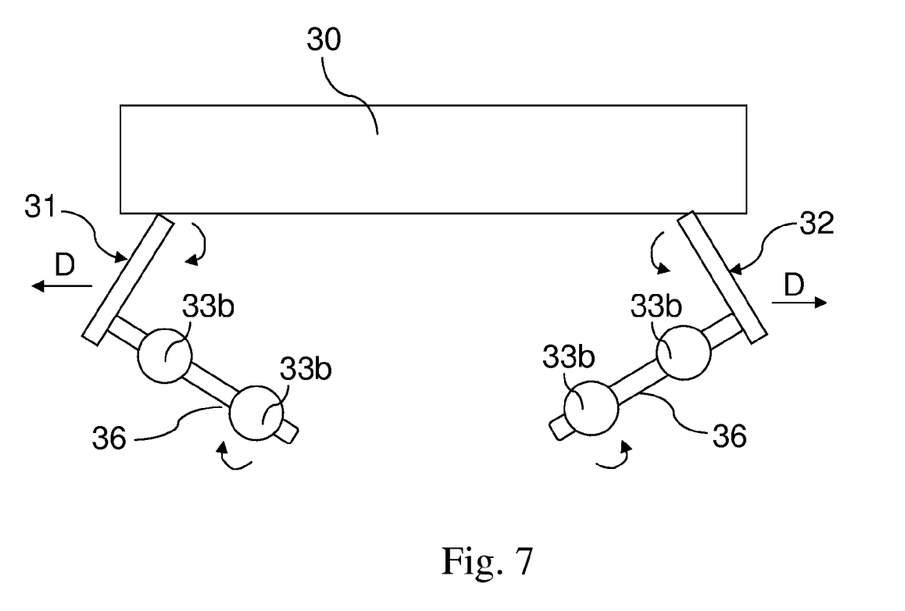
FIG. 7 schematically shows another embodiment of the system of the invention.

In a twelfth embodiment of the system 100, shown in FIG. 7, the tool 3 can be analogous to the tool 3 of the eleventh embodiment but also comprises a second support structure 32 analogous to the first support structure 31, which pivots in the opposite direction to which the first support structure 31 pivots, the rotary members 33b of the first support structure 31 and the rotary members 33b of the second support structure 32 rotating in an opposite direction, and which is displaced in the direction of displacement D when the first support structure 31 is displaced, but in the opposite direction, in the same manner as referred to in the fifth embodiment. In the twelfth embodiment the support structures 31 and 32 are disposed in relation to the stationary structure 30 in a different manner to the rest of the embodiments, the support members 36 facing each other and not adjacent to each other. As a result, in this case the axis of rotation 31R of the structures is transverse to the stationary structure 30.

This invention is not limited to only the embodiments and configurations referred to. In the embodiments and/or configurations that allow it, the tool 3 can also comprise a stopper (not shown in the figures) to the product 2 being dropped accidentally when the tool 3 is displaced from one position in which a product 2 is loaded to a position in which it is unloaded on the packaging machine, and/or to obtain a greater control in the unloading of the product 2, the stopper being deactivated when required. Similarly, it is also possible to include a pusher member (not shown in the figures) that holds the product on the support means during the movement of the tool 3 from the loading position to the unloading position, and/or guide the product 2 to aid in the unloading of the product 2.

Furthermore, the invention is not restricted to the specific embodiments and/or configurations described herein.

What is claimed is:

1. A system for loading and unloading a food product, the system comprising:
   a food product transporter comprising plurality of longitudinal and spaced-apart belts that are situated parallel to one another and that move in unison to carry and move the food product; and
   a tool adapted to load the food product from the transporter, the tool comprising a stationary structure and a support structure, the support structure moveable between first and second vertical positions and first and second horizontal positions with respect to the stationary structure, the support structure comprising a plurality of spaced-apart and elongate rotary support members that are each rotatably coupled to the support structure, the plurality of spaced-apart rotary support members situated between the plurality of spaced-apart belts and collectively configured to lift the food product from the transporter while the support structure is in the first horizontal position and moved from the first vertical position to the second vertical position, the tool adapted to unload the food product lifted from the transporter upon the support structure being moved at a first speed from the first horizontal position to the second horizontal position, each of the plurality of spaced-apart rotary support members adapted to rotate at a peripheral speed about their own axis in a direction opposite to the horizontal movement of the support structure as the support structure is moved from the first horizontal position to the second horizontal position, the peripheral speed being substantially equal to the first speed.

2. A system according to claim 1, wherein the support structure is adapted to pivot in relation to the stationary structure during the unloading of the food product.

3. A system according to claim 1, wherein the tool comprises an actuator and a main belt in the stationary structure with freedom of movement, the support structure being fixed to the main belt and the actuator configured to operate on the main belt to cause the displacement of the support structure between the first and second horizontal positions.

4. A system according to claim 2, wherein the support structure pivots about a pivot axis and the rotary support members each rotate about their own axis of rotation, the pivot axis and axis of rotation of the rotary support members being parallel to one another.

5. A system according to claim 1, wherein the rotary support members are rotated by a drive assembly, the drive assembly comprising a gear assembly that causes the rotary support members to rotate at the peripheral speed as the support structure is moved from the first horizontal position to the second horizontal position at the first speed.

6. A system according to claim 5, wherein the drive assembly comprises one or more gear wheels that move with the support structure, the one or more gear wheels adapted to rotate when the support structure moves from the first horizontal position to the second horizontal position, and an auxiliary wheel fixed to each of the plurality of rotary member, the auxiliary wheels operatively coupled to the one or more gear wheels so that the rotation of the one or more gear wheels causes a rotation of the auxiliary wheels and their corresponding rotary members.

7. A system according to claim 6, wherein the drive assembly comprises a drive wheel having a first diameter that rotates in conjunction with the gear wheel and which transmits the rotation of the gear wheel to the auxiliary wheel through a drive belt, the drive assembly being fixed to the main belt and adapted to move in conjunction with the main belt, the auxiliary wheel comprising a second diameter substantially equal to double the first diameter.

8. A system according to claim 6, wherein the drive assembly comprises a drive wheel having a first diameter that rotates in conjunction with the gear wheel and which transmits the rotation of the gear wheel to the auxiliary wheel through a drive belt, the drive assembly being fixed to the stationary structure, the auxiliary wheel having a second diameter substantially equal to the first diameter.

9. A system for loading and unloading a food product, the system comprising:
a food product transporter comprising plurality of longitudinal and spaced-apart belts that are situated parallel to one another and that move in unison to carry and move the food product; and
a tool adapted to load the food product from the transporter, the tool comprising a stationary structure, a first support structure and a second support structure, each of the first and second support structure moveable between first and second vertical positions and respective first and second horizontal positions with respect to the stationary structure, each of the first and second support structures comprising a plurality of spaced-apart and elongate rotary support members that are each rotatably coupled to the respective first and second support structures, the plurality of spaced-apart rotary support members situated between the plurality of spaced-apart belts and collectively configured to lift the food product from the transporter while the first and second support structures are in their respective first horizontal positions and moved from the first vertical position to the second vertical position, the tool adapted to unload the food product lifted from the transporter upon the first and second support structures being moved at a first speed in opposite directions from their respective first horizontal positions to their respective second horizontal positions, each of the plurality of spaced-apart rotary support members adapted to rotate with a peripheral speed about their own axis in a direction opposite to the horizontal movement of their respective first and second support structures as the first and second support structures are moved from their respective first horizontal positions to their respective second horizontal positions, the peripheral speed being substantially equal to the first speed.

10. A system according to claim 9, wherein the first and second support structures are adapted to pivot in opposite directions in relation to the stationary structure during the unloading of the food product.

11. A system according to claim 9, wherein the tool comprises an actuator and a main belt in the stationary structure with freedom of movement, each of the first and second support structures being fixed to opposite sides and different vertical positions of the main belt, the actuator configured to operate on the main belt to cause the displacement of the first and second support structures between their respective first and second horizontal positions.

12. A system according to claim 10, wherein the first support structure pivots about a first pivot axis, the second support structure pivots about a second pivot axis and the rotary members each rotate about their own axis of rotation, the first pivot axis, second pivot axis and the axis of rotation of the rotary support members being parallel.

13. A system according to claim 9, wherein the rotary support members are rotated by a drive assembly, the drive assembly comprising a gear assembly that causes the rotary members to rotate at the peripheral speed as their respective first and second support structure is moved from their respective first horizontal position to their respective second horizontal position at the first speed.

14. A system for loading and unloading a food product, the system comprising:
a food product transporter comprising plurality of longitudinal and spaced-apart belts that are situated parallel to one another and that move in unison to carry and move the food product; and
a tool adapted to load the food product from the transporter, the tool comprising a stationary structure and a support structure, the support structure moveable between first and second vertical positions and first and second horizontal positions with respect to the stationary structure, the support structure comprising a plurality of spaced-apart and elongate support members, each of the support members having at least one rotary member joined thereto with freedom of rotation, the axis of rotation in which each of the rotary members rotates being transverse to a longitudinal axis of the corresponding support member, the plurality of support members situated between the plurality of spaced-apart belts and collectively configured to lift the food product from the transporter while the support structure is in the first horizontal position and moved from the first vertical position to the second vertical position, the tool adapted to unload the food product lifted from the transporter upon the support structure being moved at a first speed from the first horizontal position to the second horizontal position, each of the rotary members adapted to rotate with a peripheral speed about their own axis in a direction opposite to the direction of horizontal movement of the support structure as the support structure is moved from the first horizontal position to the second horizontal position, the peripheral speed being substantially equal to the first speed.

15. A system according to claim 14, wherein the support structure is adapted to pivot in relation to the stationary structure during the unloading of the food product.

16. A system according to claim 14, wherein the tool comprises an actuator and a main belt coiled in the stationary structure with freedom of movement, the support structure being fixed to the main belt and the actuator configured to operate on the main belt to cause the displacement of the support structure between the first and second horizontal positions.

17. A system according to claim 15, wherein the support structure pivots about a pivot axis and the rotary members each rotate about their own axis of rotation, the pivot axis and axis of rotation of the rotary members being orthogonal to one another.

18. A system according to claim 14, wherein the rotary members are rotated by a drive assembly, the drive assembly causes the rotary members to rotate at the peripheral speed as the support structure is moved from the first horizontal position to the second horizontal position at the first speed.

19. A system for loading and unloading a food product, the system comprising:
a food product transporter comprising plurality of longitudinal and spaced-apart belts that are situated parallel to one another and that move in unison to carry and move the food product; and
a tool adapted to load the food product from the transporter, the tool comprising a stationary structure and a first support structure and a second support structure, each of the first and second support structures moveable between first and second vertical positions and respective first and second horizontal positions with respect to the stationary structure, each of the first and second support structures comprising a plurality of spaced-apart and elongate support members, each of the support members having at least one rotary member joined thereto with freedom of rotation, the axis of rotation in which each of the rotary members rotates being transverse to a longitudinal axis of the corresponding support member, the plurality of support members situated between the plurality of spaced-apart belts and collectively configured to lift the food product from the transporter while the first and second support structures are in their respective first horizontal positions and moved from the first vertical position to the second vertical position, the tool adapted to unload the food product lifted from the transporter upon the first and second support structures being moved in opposite directions and at a first speed from their respective first horizontal positions to their respective second horizontal positions, each of the rotary members adapted to rotate with a peripheral speed about their own axis in a direction opposite to the direction of horizontal movement of their respective first and second support structure as the first and second support structures are moved from their respective first horizontal positions to their respective second horizontal positions, the peripheral speed being substantially equal to the first speed.

20. A system according to claim 19, wherein the first and second support structures are adapted to pivot in opposite directions in relation to the stationary structure during the unloading of the food product.

21. A system according to claim 20, wherein the first support structure pivots about a first pivot axis, the second support structure pivots about a second pivot axis and the rotary members each rotate about their own axis of rotation, the first pivot axis and the second pivot axis each being orthogonal to the axis of rotation of the rotary members.

22. A system for loading and unloading a food product, the system comprising:
a food product transporter comprising plurality of longitudinal and spaced-apart belts that are situated parallel to one another and that move in unison to carry and move the food product; and
a tool adapted to load the food product from the transporter, the tool comprising a stationary structure and a support structure, the support structure moveable between first and second vertical positions and pivotable between first and second angular positions with respect to the stationary structure, the support structure comprising a plurality of spaced-apart and elongate rotary support members that are each rotatably coupled to the support structure, the plurality of spaced-apart rotary support members situated between the plurality of spaced-apart belts and collectively configured to lift the food product from the transporter while the support structure is in the first angular position and moved from the first vertical position to the second vertical position, the tool adapted to unload the food product lifted from the transporter upon the support structure pivoting from the first angular position to the second angular position, each of the plurality of spaced-apart rotary support members adapted to rotate about their own axis in the same direction to the pivotal rotation of the support structure as the support structure is moved from the first angular position to the second angular position.

23. A system according to claim 1, wherein the tool comprises an actuator and a main belt in the stationary structure with freedom of movement, the support structure being fixed to the main belt and the actuator configured to operate on the main belt to cause the displacement of the support structure between the first and second angular positions.

24. A system according to claim 22, wherein the support structure pivots about a pivot axis and the rotary support members each rotate about their own axis of rotation, the pivot axis and axis of rotation of the rotary support members being parallel to one another.

25. A system according to claim 22, wherein the rotary support members are rotated by a drive assembly, the drive assembly comprising a gear assembly that causes the rotary support members to rotate as the support structure is moved from the first angular position to the second angular position.

26. A system according to claim 25, wherein the drive assembly comprises one or more gear wheels that move with the support structure, the one or more gear wheels adapted to rotate when the support structure moves from the first angular position to the second angular position, and an auxiliary wheel fixed to each of the plurality of rotary member, the auxiliary wheels operatively coupled to the one or more gear wheels so that the rotation of the one or more gear wheels causes a rotation of the auxiliary wheels and their corresponding rotary members.

27. A system according to claim 26, wherein the drive assembly comprises a drive wheel having a first diameter that rotates in conjunction with the gear wheel and which transmits the rotation of the gear wheel to the auxiliary wheel through a drive belt, the drive assembly being fixed to the main belt and adapted to move in conjunction with the main belt, the auxiliary wheel comprising a second diameter substantially equal to double the first diameter.

28. A system according to claim 26, wherein the drive assembly comprises a drive wheel having a first diameter that rotates in conjunction with the gear wheel and which transmits the rotation of the gear wheel to the auxiliary wheel through a drive belt, the drive assembly being fixed to the stationary structure, the auxiliary wheel having a second diameter substantially equal to the first diameter.

29. A system for loading and unloading a food product, the system comprising:
a food product transporter comprising plurality of longitudinal and spaced-apart belts that are situated parallel to one another and that move in unison to carry and move the food product; and
a tool adapted to load the food product from the transporter, the tool comprising a stationary structure, a first support structure and a second support structure, each of the first and second support structure moveable between first and second vertical positions and pivotable between respective first and second angular positions with respect to the stationary structure, each of the first and second support structures comprising a plurality of spaced-apart and elongate rotary support members that are each rotatably coupled to the respective first and second support structures, the plurality of spaced-apart rotary support members situated between the plurality of spaced-apart belts and collectively configured to lift the food product from the transporter while the first and second support structures are in their respective first angular positions and moved from the first vertical position to the second vertical position, the tool adapted to unload the food product lifted from the transporter upon the first and second support structures pivoting in opposite directions from their respective first angular positions to their respective second angular positions, each of the plurality of spaced-apart rotary support members adapted to rotate about their own axis in the same direction to the pivotal rotation of their respective first and second support structures as the first and second support structures are moved from their respective first angular positions to their respective second angular positions.

30. A system according to claim 29, wherein the tool comprises an actuator and a main belt in the stationary structure with freedom of movement, each of the first and second support structures being fixed to opposite sides and different vertical positions of the main belt, the actuator configured to operate on the main belt to cause the displacement of the first and second support structures between their respective first and second angular positions.

31. A system according to claim 29, wherein the first support structure pivots about a first pivot axis, the second support structure pivots about a second pivot axis and the rotary members each rotate about their own axis of rotation, the first pivot axis, second pivot axis and the axis of rotation of the rotary support members being parallel.

32. A system according to claim 29, wherein the rotary support members are rotated by a drive assembly, the drive assembly comprising a gear assembly that causes the rotary members to rotate as their respective first and second support structure is moved from their respective first angular position to their respective second angular position.

33. A system for loading and unloading a food product, the system comprising:
a food product transporter comprising plurality of longitudinal and spaced-apart belts that are situated parallel to one another and that move in unison to carry and move the food product; and
a tool adapted to load the food product from the transporter, the tool comprising a stationary structure and a support structure, the support structure moveable between first and second vertical positions and pivotable between first and second angular positions with respect to the stationary structure, the support structure comprising a plurality of spaced-apart and elongate support members, each of the support members having at least one rotary member joined thereto with freedom of rotation, the axis of rotation in which each of the rotary members rotates being transverse to a longitudinal axis of the corresponding support member, the plurality of support members situated between the plurality of spaced-apart belts and collectively configured to lift the food product from the transporter while the support structure is in the first angular position and moved from the first vertical position to the second vertical position, the tool adapted to unload the food product lifted from the transporter upon the support structure pivoting from the first angular position to the second angular position, each of the rotary members adapted to rotate about their own axis in the same direction to the direction of rotation of the support structure as the support structure is moved from the first angular position to the second angular position.

34. A system according to claim 33, wherein the tool comprises an actuator and a main belt coiled in the stationary structure with freedom of movement, the support structure being fixed to the main belt and the actuator configured to operate on the main belt to cause the displacement of the support structure between the first and second angular positions.

35. A system according to claim 33, wherein the rotary members are rotated by a drive assembly, the drive assembly causes the rotary members to rotate as the support structure is moved from the first angular position to the second angular position.

36. A system for loading and unloading a food product, the system comprising:
a food product transporter comprising plurality of longitudinal and spaced-apart belts that are situated parallel to one another and that move in unison to carry and move the food product; and
a tool adapted to load the food product from the transporter, the tool comprising a stationary structure and a first support structure and a second support structure, each of the first and second support structures moveable between first and second vertical positions and pivotable in opposite directions between respective first and second angular positions with respect to the stationary structure, each of the first and second support structures comprising a plurality of spaced-apart and elongate support members, each of the support members having at least one rotary member joined thereto with freedom of rotation, the axis of rotation in which each of the rotary members rotates being transverse to a longitudinal axis of the corresponding support member, the plurality of support members situated between the plurality of spaced-apart belts and collectively configured to lift the food product from the transporter while the first and second support structures are in their respective first angualr positions and moved from the first vertical position to the second vertical position, the tool adapted to unload the food product lifted from the transporter upon the first and second support structures pivoting between their respective first angular positions to their respective second angular positions, each of the rotary members adapted to rotate about their own axis in the same direction as the respective direction of pivotal rotation of their respective first and second support structure as the first and second support structures are moved from their respective first angular positions to their respective second angular positions.

\* \* \* \* \*